UNITED STATES PATENT OFFICE.

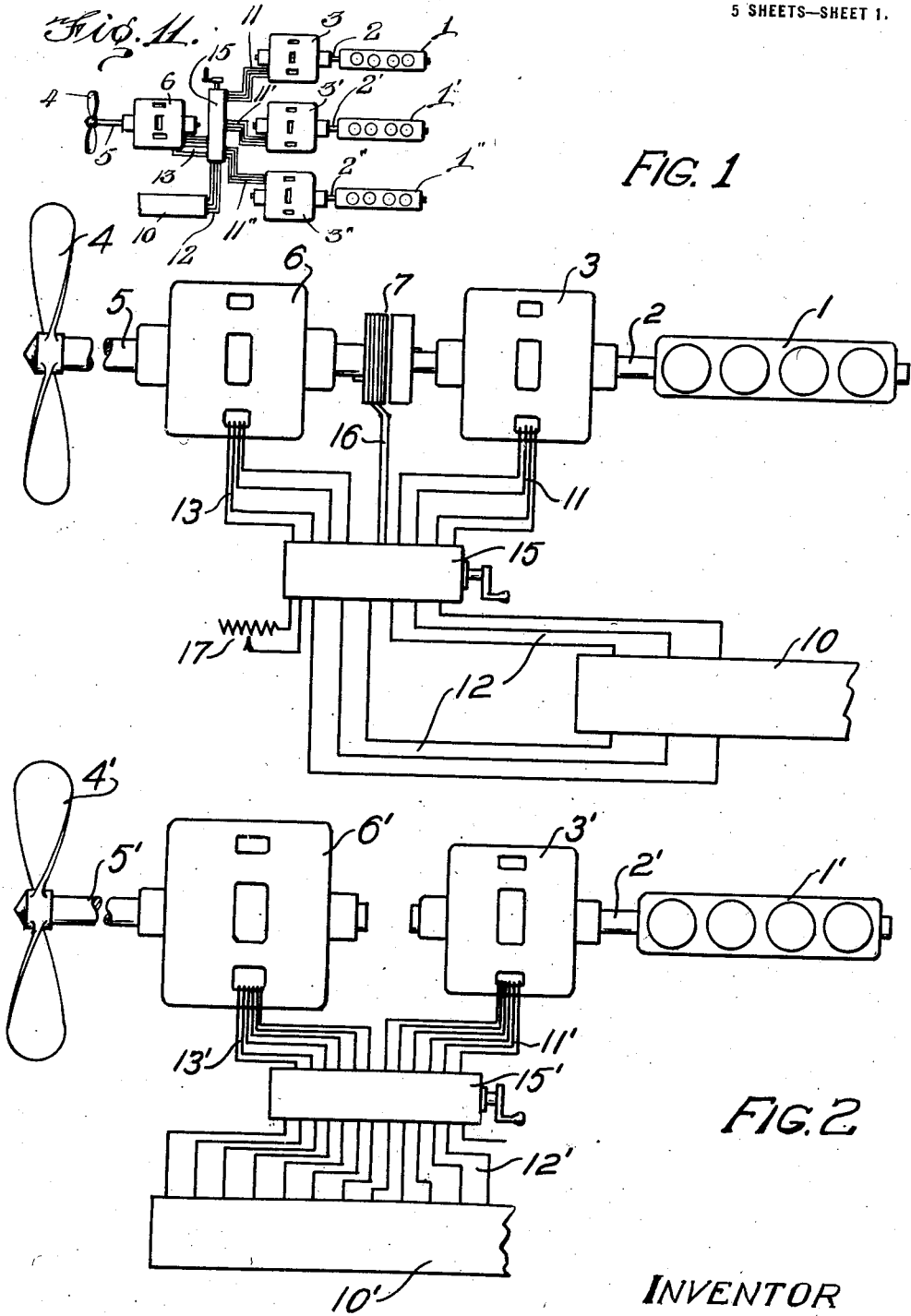

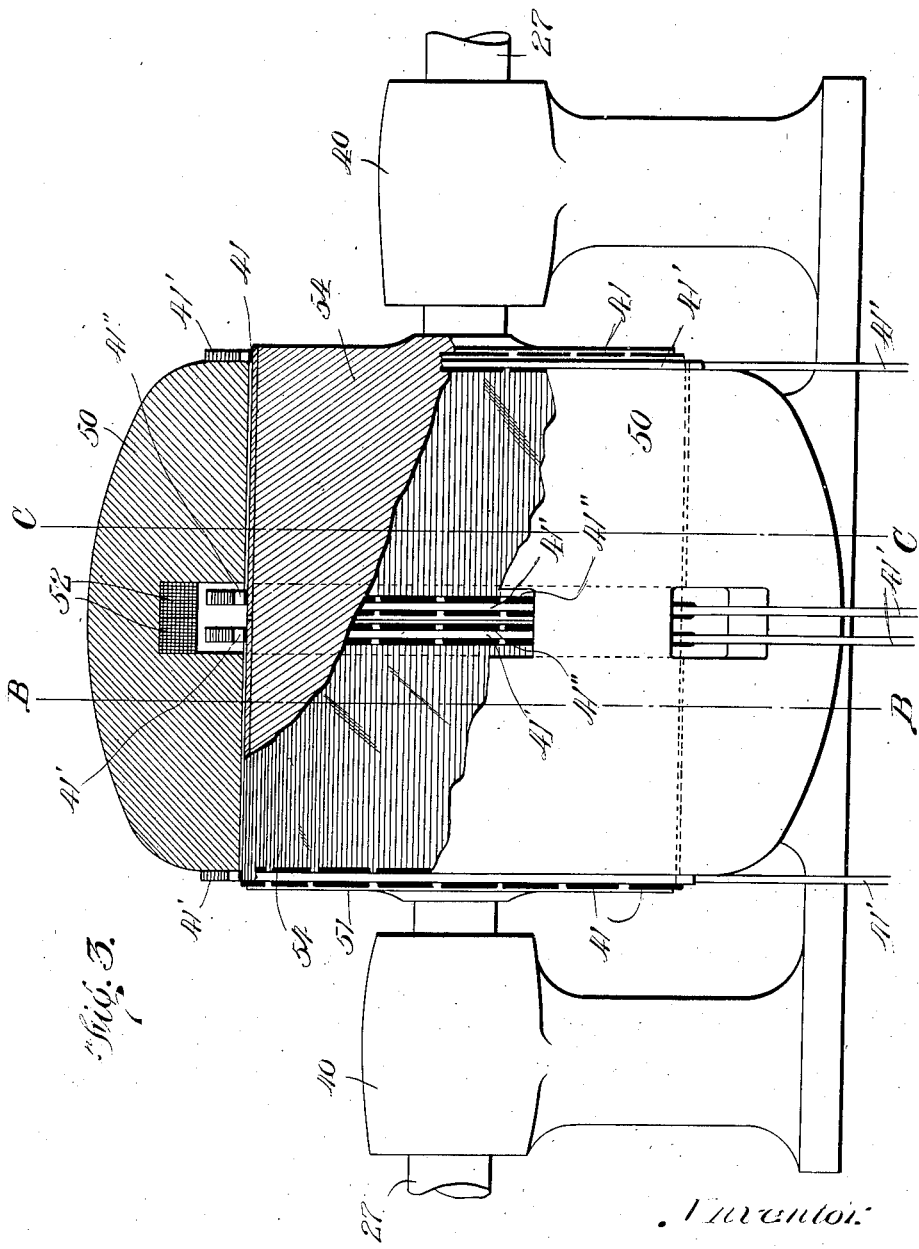

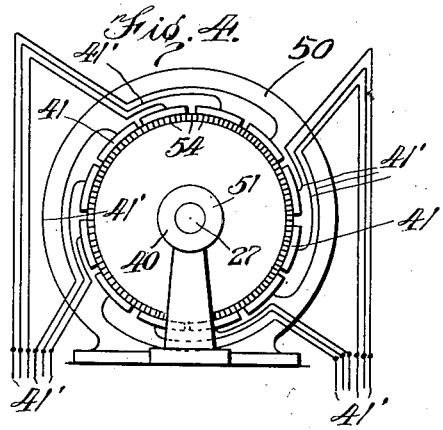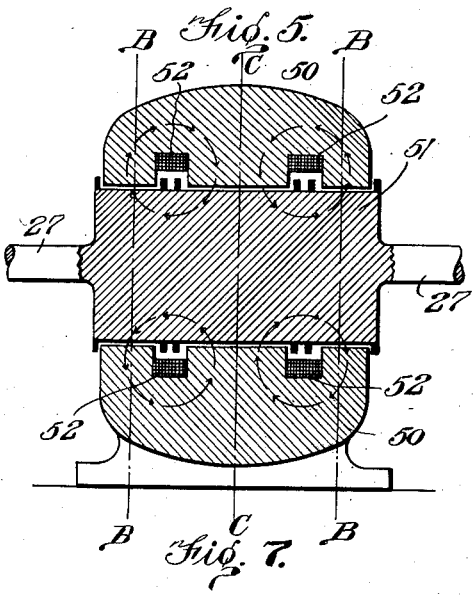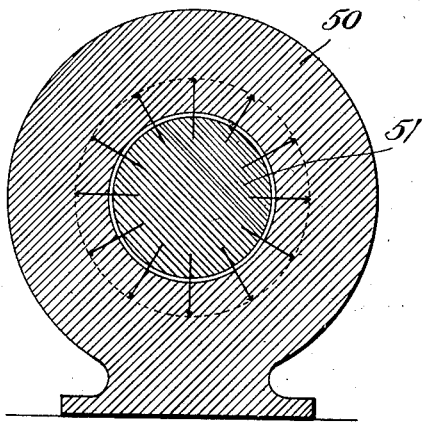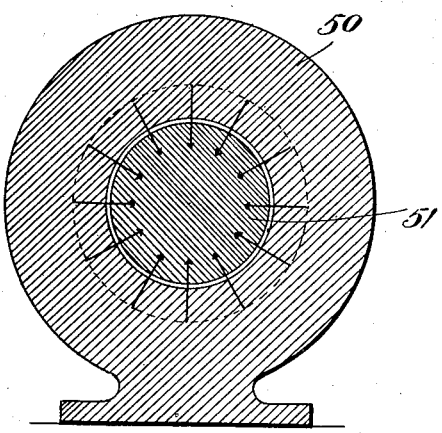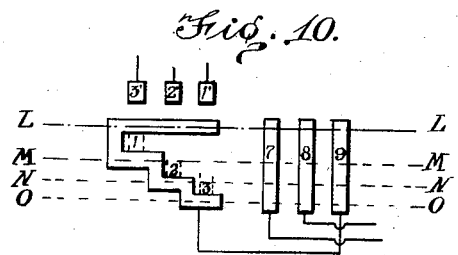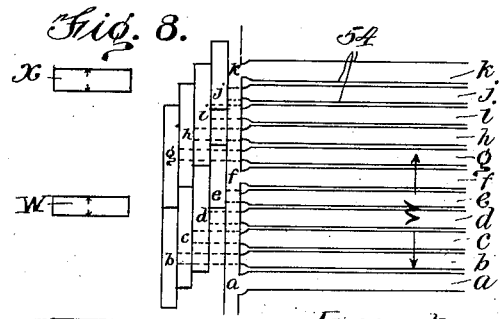

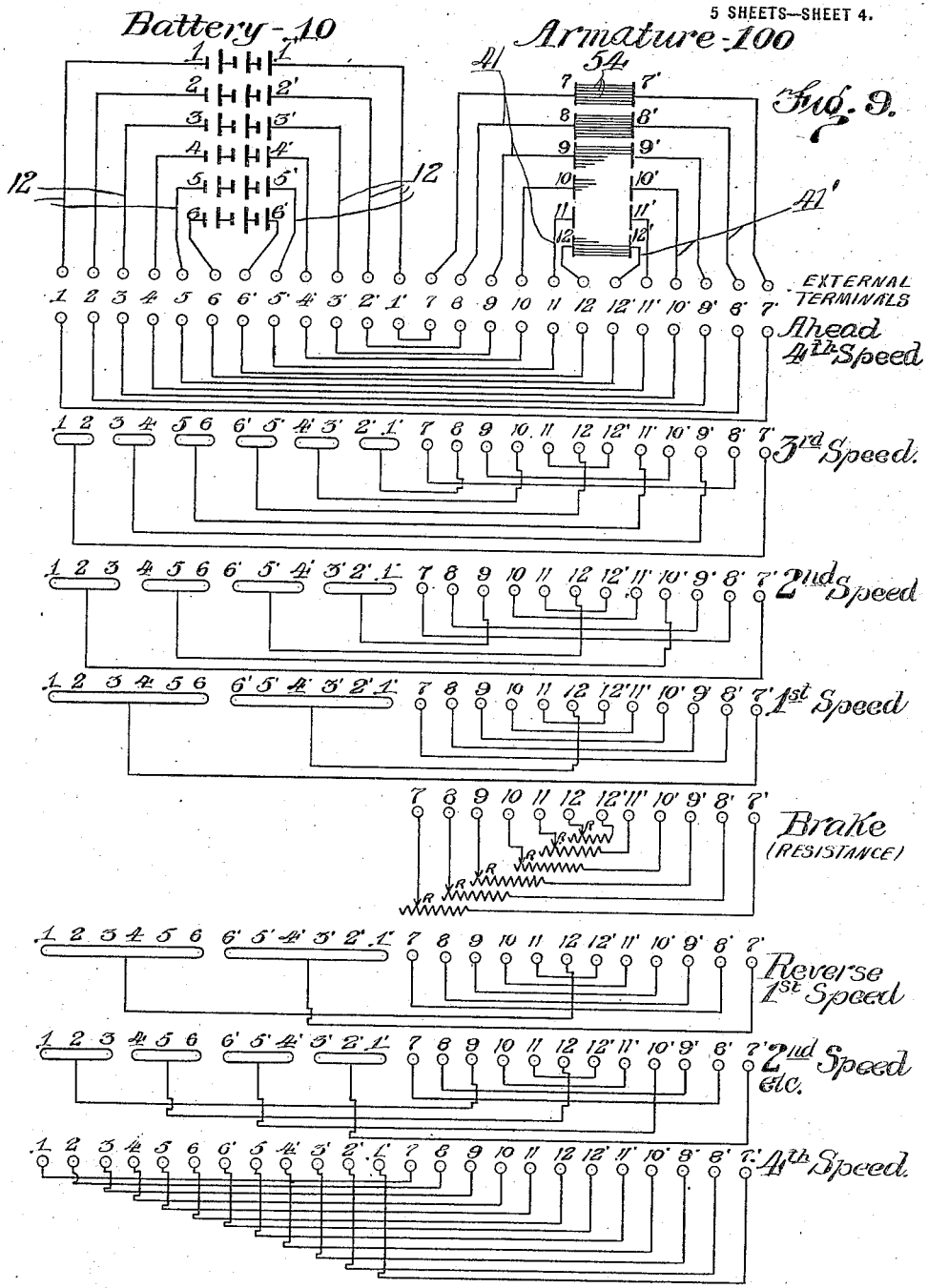

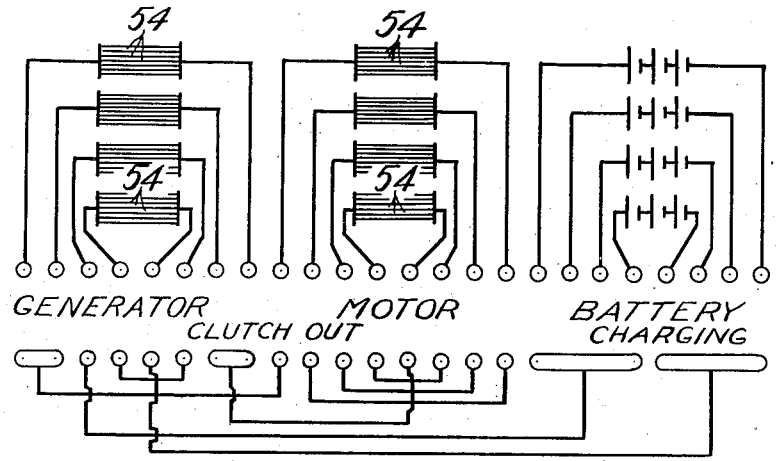
FIG. 12.
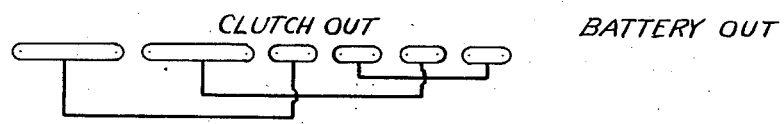
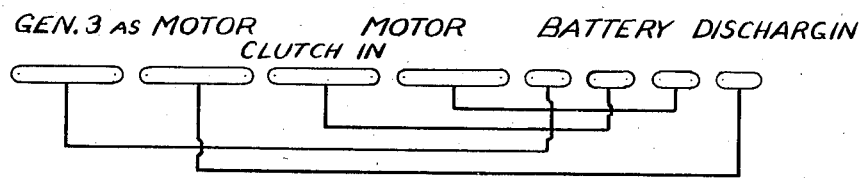
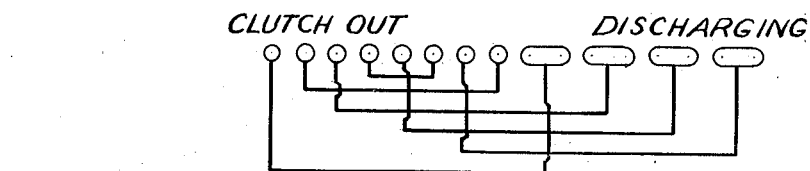
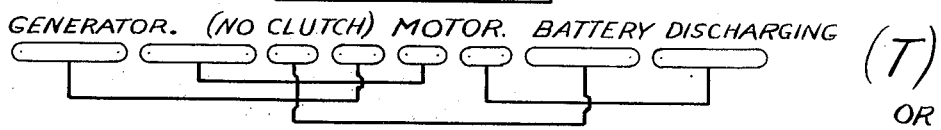
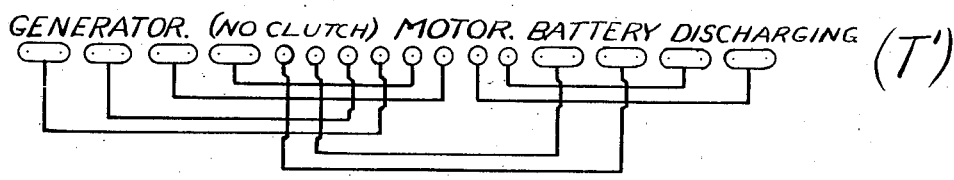

ROBERT V. MORSE, OF ITHACA, NEW YORK.

SUBMARINE-PROPULSION SYSTEM.

1,332,631.  Specification of Letters Patent.  Patented Mar. 2, 1920.

Application filed February 5, 1916. Serial No. 76,396.

*To all whom it may concern:*

Be it known that I, ROBERT V. MORSE, a citizen of the United States, residing at Ithaca, in the county of Tompkins and State of New York, have invented new and useful Submarine-Propulsion Systems, of which the following, taken with the accompanying drawings, is a specification.

My invention relates to a propulsion system for submarines, and has for its objects the improvement of the speed and maneuvering qualities of such vessels,—by providing a system which is susceptible to prompt and positive control, and which can, for limited periods, exert several times its normal horsepower. Thus, when the enemy is sighted, the submarine may overtake it by a temporary burst of speed: or if the submarine is surprised, it may be quickly maneuvered to escape. Another object of my invention is, to increase the cruising radius by enabling the engines to operate at an efficient high speed while the vessel is running at cruising speeds; and also to permit the use of larger propellers than have heretofore been practicable. A further object is to allow the use of higher-speed, smaller engines; and various other objects will appear in the following specification.

In the drawings which form part of this specification:

Figure 1 is a general plan of one form of the propulsion system.

Fig. 2 is a general plan of a modified form of the propulsion system.

Fig. 3 is a side elevation partly in section of a typical form of motor or generator of the homopolar type, which is employed in this system.

Fig. 4 is an end elevation of a similar motor or generator of the homopolar type.

Fig. 5 is a longitudinal cross-sectional view of a homopolar machine showing a modified form of field and armature.

Fig. 6 is a transverse cross-section on the line B—B of Fig. 5 or Fig. 3, showing the direction of magnetic flux.

Fig. 7 is a section similar to Fig. 6 but on the line C—C of Fig. 3 or Fig. 5.

Fig. 8 illustrates a modified brush arrangement with the brushes more widely spaced.

Fig. 9 is a diagram of one form of circuit controller illustrating the battery and motor connections whereby a large amount of power may be put through the motor, and how various running speeds are obtained without the use of resistances.

Fig. 10 illustrates a modified form of controller connection whereby different battery units may be used or charged.

Fig. 11 shows several generators driving one motor.

Fig. 12 shows by way of illustration some of the methods by which the main connections may be made.

In Fig. 1 of the drawings, the reference numeral 1 indicates an internal combustion engine or other prime mover suitable for marine work. Connected to the engine 1 through the shaft 2 is the D. C. electric generator 3. This generator 3 is preferably of the type described in my copending applications Ser. No. 24,107, electric ship propulsion system, filed April 26, 1915, and Ser. No. 24,108, submarine propulsion system, filed April 26, 1915,—having a number of independent armature circuits which may be readily connected in various series and parallel relations to give various E. M. F.'s and current carrying capacities with a given speed, or various speeds with a given E. M. F.,—and which is adapted to carry very large currents. Other types of electric generators may however be used. This generator 3, being a D. C. machine, may of course equally as well be termed a motor, and may be operated as a motor, by reversing the field or armature circuits in the usual manner; and in machines where the E. M. F. may be widely varied,—as in the type mentioned above,—the generator may be caused to run as a motor by sufficiently reducing its E. M. F. or counter E. M. F. so that the batteries send the current back, causing a reverse flow. This may be done by weakening the field or shortening the length of the armature circuit.

A clutch (not shown) may also be used between the engine 1 and generator 3, so that both generator 3 and motor 6 may operate as motors when running on battery alone, if desired. But as the highest speeds are generally only required on the surface, the use of such a clutch is not strictly necessary.

The propeller 4 is driven through the shaft 5 on which is also mounted the D. C.

electric motor 6. This motor 6 is preferably of the type referred to above having various running speeds and being capable of carrying very large currents, and of holding its speed even with a falling voltage, as will be described later. Other types of motor may however be used. The engine 1 and generator 3 may be directly connected with the motor 6 and propeller 4 by means of the clutch 7, which is preferably of the electrically controlled type, though any other type of clutch might be used.

Figs. 3, 4, 5, 6, 7 and 8 illustrate one type of motor or generator which may be employed in this system. It consists in general of a machine having homopolar fields, no commutator, and a large number of brushes connected to independent armature circuits,—these brushes having external connections by which their numerous independent armature circuits may readily be connected in series or parallel to various extents as desired, to change the speed or electromotive force of the machine. Referring to Figs. 3 and 4, the field structure of the homopolar machine is indicated by the reference numeral 50, and consists of a simple casting or castings extending entirely around the armature 51, which is carried on the shaft 27, (corresponding to shaft 2 or shaft 5 of Figs. 1 and 2), the shaft 27 being mounted in the bearings 40, 40. The field structure 50 is excited by the field coils 52 so as to give a magnetic flux lying in generally axial planes. The direction of the magnetic flux is represented in Figs. 6 and 7 by the arrows, which show that the left hand field of Fig. 3 is annular and all of the same polarity, and the right hand field of Fig. 3 is also annular and all of the same polarity, though opposite in polarity to the left hand field. Such annular fields of unchanging polarity are called homopolar. One, two, three, four or any number of such annular fields may be used side by side in a single machine; for example, Fig. 5 shows a field structure with three homopolar fields,—one at each end and a broad one in the middle between the two sets of field coils 52, 52. The path of the magnetic flux is indicated by the arrows; and the sectional views shown in Figs. 6 and 7 also apply to Fig. 5.

The armature 51 has mounted in or near its periphery a large number of comparatively narrow armature conductors 54, 54, a set or zone of which extends longitudinally across each homopolar field. These armature conductors 54, 54 are insulated from each other, from the armature core, and generally from the armature conductors of other zones. Each zone of the armature conductors 54, 54 is bordered on its two edges by sets of brushes 41, 41″, which are closely spaced peripherally around the armature. The brushes need only be spaced from others in the same set to the width of a single armature conductor 54, which may be very narrow. The brushes are not necessarily so extended peripherally, for as shown in Fig. 8 the heads on the conductors may be extended peripherally to meet the brushes instead of extending the brushes peripherally to meet the armature conductors. Thus in Fig. 8 the armature conductors 54,—labeled $a, b, c, d, e, f, g, h, i, j, k$,—are shown made with T shaped heads which are labeled to correspond to their respective conductors. These heads extend to meet the brushes, so that for example a brush with a width equal to the width of the band of T heads, and a peripheral length equal to $w$ would contact with the heads from $b$ to $g$ inclusive, or equal to the extent marked $w'$. The adjacent brushes would lie at $v$ and $x$ respectively; all the brushes are shown displaced to one side for the sake of clearness. The current flows in general, with either brush construction, into the armature conductors 54 from one set of brushes as 41, and out from the armature conductors through the other set as 41″, and in the normal operation of the machine the current is not reversed in any armature conductor at any point in its rotation; hence no commutator or other current rectifier is required. The current in general flows in opposite directions in adjacent zones, where the fields are of opposite polarity, and so in Fig. 3 it may be considered as flowing for example in at both ends of the armature and out at the middle, or vice-versa. From each brush or group of brushes runs a separate external lead 41′. The external leads 41′ in going to or from their respective brushes are made to extend spirally as shown in Fig. 4, in the proper direction so that whatever magnetic flux is created around them will aid to strengthen the field of the machine. Each brush, or such groups of brushes as may be desired, has a separate external lead; and these separate terminals may be conveniently grouped where desired, as for example at the circuit controller 15. The main armature circuit is thus made up of a considerable number of shorter independent armature circuits which may receive current from separate external sources or may be connected in series or parallel to any desired extent. Because of the large cross-sectional area of the conducting material in the armature circuits, enormous currents may be carried by the machine without danger of its burning out. It is this feature, among others, which makes the homopolar type particularly fitted for the requirements of this system.

Having thus provided a motor or generator which can safely carry very large currents through a number of independent armature circuits, the circuit controller 15 is provided to connect the various motor circuits, and the various battery circuits in any desired combinations or arrangements. A sample arrangement of a limited number of such connections, such as could be conveniently illustrated in a limited space, is shown by way of example in Fig. 9. In the upper part of Fig. 9 a storage battery of six units is conventionally shown, the ingoing terminals of the battery being numbered respectively 1 to 6, and the outgoing terminals being similarly numbered from 1' to 6'. Six units or groups are shown because convenient for illustration, but any number may be used, and the internal connection within each unit may be varied and arranged as will give the best results in any particular installation, and need not be discussed in detail here. From the terminals of the various battery units the leads 12 run to their respective terminals at the circuit controller, which are numbered 1, 2, 3, 4, 5, 6, 6', 5', 4', 3', 2', 1', respectively in Fig. 9 to correspond to the battery terminals. At the upper right hand side of Fig. 9 is shown a group of six armature circuits, the brushes on one side being numbered 7 to 12 respectively and the brushes on the other side numbered 7' to 12' respectively,—with the armature conductors 54 lying in between. The armature current flows longitudinally of the armature conductors across between correspondingly numbered brushes,—as between 7 and 7'; 8 and 8'; etc. The armature rotates at right angles to the current flow, that is, the armature conductors would run up and down under the brushes of Fig. 9; so that a given armature conductor might first lie under the brushes numbered 7—7'; then under 8—8'; and so on. While six pairs of brushes have been shown in Fig. 9 for convenience of illustration, it should be understood that any number of brushes might be used; and they need not necessarily lie in the same armature zone. There may also be permanent connections between brushes forming them into groups, with only one pair of external terminals from each group running to the controller. In Fig. 9 the various armature conductor units are shown connected through the leads 41' with their respective external terminals at the circuit controller,—which are numbered 7, 8, 9, 10, 11, 12, 12', 11', 10', 9', 8', 7', to correspond to the brushes. Below the line of external terminals thus brought out are shown a few of the numerous connections which can then be readily made. The terminals of the conductors through which the connections are made have over them the numbers of the external terminals with which they connect. These various connecting conductors may have their terminals on a drum which may be turned like the ordinary drum controller to bring the connections for the various speeds in contact with the external terminals of the battery and armature. Any other ordinary type of switch or controller suitable for a considerable number of circuits might be used.

With the connections made as shown for the fourth speed ahead, there would be one circuit from the battery through the armature as follows, 1', 7, 7', 1; there would be another independent circuit 2', 8, 8', 2; another independent circuit 3', 9, 9', 3; and so on, giving six independent circuits in all, and a very large current flow and high speed. For the third speed ahead the battery units are shown as connected in parallel in groups of two, and the armature units connected in series in groups of two; thus the circuit is 1' and 2', 8, 8', 7, 7', 1 and 2; another independent circuit 3' and 4', 10, 10', 9, 9', 3 and 4; another independent circuit 5' and 6', 12, 12', 11, 11', 5 and 6. For the second speed ahead the battery units are shown connected in parallel in groups of three, and the armature units connected in series in groups of three; one circuit is 1' and 2' and 3', 9, 9', 8, 8', 7, 7', 1 and 2 and 3; there is another independent circuit at this speed which may be traced out on the same principle as above. For the lowest speed or the first speed ahead, all the battery units are in parallel and all the motor units are in series; that is, all the battery terminals 1' to 6' inclusive are connected to the terminal 12; the circuit then running 12, 12', 11, 11', 10, 10', 9, 9', 8, 8', 7, 7', while 7' is connected to all the battery terminals 1 to 6 inclusive.

The same speeds may readily be obtained in the reverse direction as illustrated in Fig. 9, under Reverse,—the connections being similar to the ahead connections except that the connections to the positive and negative battery terminals are interchanged,—so that for example a connection is made to 1 instead of to 1'. The third speed reverse has not been diagrammed in Fig. 9 because of lack of space, but the manner of connection is like the corresponding speed ahead, except for the reversal of battery connections, which is effected in the same manner as shown in the first, second and fourth reverse speeds of Fig. 9. The great flexibility of such a method of control is evident, and many other arrangements and connections may be readily made as will be apparent to those skilled in the art.

Between the ahead connections and the reverse connections is shown a connection marked Brake which consists in completing the armature circuits through resistance marked R, R, etc., and which is numbered 17 in Fig. 1. The battery circuits are at this time disconnected. The resistance is shown as variable in order that it may be reduced as the motor slows down, to keep the braking effect at a maximum; but it would operate almost as satisfactorily if it were not variable. In Fig. 9 a separate resistance is shown in each independent armature circuit unit. In Fig. 1 only a single resistance 17 is shown, to which all the armature circuits would be simultaneously connected. Either form might be used,—the advantage of maintaining a number of independent circuits being increased in reliability. The resistance need not necessarily be built in the controller itself; indeed, it is preferable to have the resistance elements outside the controller proper, and they may be connected with the controller through suitable external terminals or brushes. A separate switch in the resistance circuit might also be used.

Instead of connecting groups of battery units in parallel in the lower speeds, as 1, 2, 3, for example in the second speed, the battery units may be individually connected to the armature circuit. For example, in Fig. 10 the battery connection at the controller is shown arranged in steps, while the armature contacts on the controller are extended so as to correspond to any of the steps. Thus for example at the second speed the detail shown in Fig. 10 illustrates how in the position 0—0 only the battery unit 1—1' of the first three units would be drawn upon; in the position N—N only the second of the first three units would be connected; and in the position M—M only the third of the first three units would be connected; while in the position L—L all of the first three battery units would be connected together in parallel, as shown in the second speed ahead of Fig. 9. The motor connections are shown as remaining the same whether a single battery unit or a group of battery units is connected. Thus at any speed if desired each armature circuit may have a separate and distinct battery circuit. Instead of steps on a controller of the drum type, a corresponding selective connection may be made by other means on other controllers as will be evident to those skilled in the art.

Storage batteries as heretofore used in marine propulsion have been arranged to discharge at a moderate rate in order that the efficiency, or total energy ultimately extracted, may be large. The batteries were ordinarily arranged to discharge in about five hours. As distinguished from the old method, where the emphasis was on efficiency, the method of operation here proposed is to discharge the batteries at the ordinary rate under ordinary conditions, but to arrange the motor circuits so that the battery may be discharged in an emergency at a much higher rate. This rapid discharge gives a greater current flow and greater power,—though the power is not directly proportional, since the volts pressure decreases when the current flow increases. But within limits the fall in voltage is not so great as the increase in current flow,—hence their product, power, becomes greater. For example, in an Edison type cell, the average voltage may be 60% of normal when the current flow is 6 times normal, giving 3.6 times the normal amount of power. I take advantage of this property of the battery to help drive the submarine at a very high speed for a limited time. While the mechanical efficiency during this dash may not be so high as in the ordinary submarine, the efficiency or effectiveness of the submarine as a fighting unit is greatly increased.

The storage battery 10 should be composed of the Edison or other type of cell which can withstand an excessive rate of discharge, without serious injury; since in the final part of a burst of speed it may be desirable to reduce the total length and increase the total conducting area of the motor armature circuit while running so as to almost short-circuit the battery,—in order to extract the maximum power from the battery and to hold the motors up to speed in the face of a dying voltage. Of course the total amount of energy, watt-hours, will not be as great as could be extracted with a slower discharge; but the power, watts, can be considerably greater for a shorter period of time. A slower and more economically efficient rate of discharge is used when great speed is not necessary. The cooling and ventilating system should of course be proportioned to the service.

In order that the various connections, (to be described later), may be readily made, the leads 11 from the generator 3, leads 12 from the battery 10, and leads 13 from the motor 6, are centralized at the controller 15. The number and arrangement of these leads depend on the type of machine and battery which may be selected. The particular form of the controller is immaterial, so long as it is of a type adapted to quickly and conveniently make the variety of connections here required. The drum type of controller might be used, for example, or the ordinary switch-board, and other ordinary types may be adapted to make the connections if desired. The number and extent of the internal series and parallel relations in the motors, the generators, and the batteries, may be readily changed by the controller to vary the speed, amperes, and volts, as described above.

Where, as in the tye of motor above mentioned, the large number of brushes in series may make it somewhat difficult to start the initial current flow, they may be thrown in parallel for an instant, just as is done with the battery units in the first speed ahead of Fig. 9, and then changed to a series connection as soon as the current flow has started.

The main connections to be made through the controller are as follows: (Q, Fig. 12) to electrically connect the generator 3 to the motor 6 for cruising, so as to establish an electrical transmission between the engine 1 and the propeller 4; (U, Fig. 12) to electrically connect to the battery 10 both the generator 3 (operating now as a motor) and the motor 6,—for fighting speeds. At this time the clutch 7 is engaged,—which may be done through the electrical connections 16 running to the controller, or by any other desired means. (S, Fig. 12) to electrically connect the battery 10 to the motor 6, for running on battery alone, as when submerged. (P, Fig. 12) to electrically connect the generator 3 to the battery 10, for charging. These four main connections, while distinct in function, need not necessarily be distinct in action, but may occur simultaneously to certain degrees. The details of the arrangements of the main connections described will vary according to the characteristics of the particular installation, as will be evident to those skilled in the art. One internal arrangement of these main connections in the controller 15 or 15' is shown by way of example in Fig. 12. It is also possible with a dynamo-electric machine having distinct armature circuits to operate as a motor and generator at the same time. Besides the four general connections here treated, the controller may contain the various connections for altering the characteristics of the three main electrical elements as regards speed, voltage, current flow, reversing, etc., by any method of control. The electrical brake or resistance 17 may also be connected to the controller, to operate on the motors if desired.

In the modification shown in Fig. 2, the engine 1' is connected through the shaft 2' to the D. C. generator 3'. The clutch 7 of the previous modification is omitted, and the propeller 4' on the shaft 5' is driven solely by the motor 6'. The generator 3' and motor 6' may be connected through their respective leads 11' and 13' to constitute an electric transmission between the engine 1' and propeller 4',—there being no mechanical driving connection between them. This permits two or more independent generating units like the engine 1' and generator 3' to be connected to the single propeller motor 6' if desired, with consequent increase in power and reliability. This is particularly desirable in large installations, where single engines of large size could not be depended upon. The generator 3', like the generator 3, may be operated as a motor if desired when starting the engine, but is not used as a motor after the engine is running. The motor 6' is generally larger than the motor 6 of Fig. 1, since the total power both for low and high speeds must be developed by the motor 6'. On the other hand, the engine 1' and generator 3' can be made smaller than in Fig. 1, since they may run at a speed above the highest propeller speed. Several such engine-generator sets may be used for each propeller if desired, as shown for example in Fig. 11.

The storage battery leads 12' from the storage battery 10', together with the leads 11' and 13' from the generator and motor,— are connected to the controller 15'. This controller 15' has four main functions; (Q, Fig. 12) to connect the generator 3' to the motor 6',—to form an electric transmission through which the engine 1' running at high speed may drive the propeller 4' at a lower speed, as for cruising; (T or T', Fig. 12) to connect the motor 6' to both the generator 3' and battery 10', to drive the propeller 4' at fighting speed; (S, Fig. 12) to connect the motor 6' to the battery 10' when the generator 3' is disconnected,—for running on battery alone as when submerged; (P, Fig. 12) to connect the generator 3' to the battery 10' for charging. Suitable means should also be provided (preferably associated with the controller), to give the various speeds, E. M. F.'s, current flows, reversals, charging rates, and other characteristics desired in the particular installation, as will be apparent to those skilled in the art. An electric resistance brake may also be provided for the motor 6', as described in connection with the modification shown in Fig. 1.

The operation of the system may be best understood if the problem which it is designed to meet is first considered. The conditions under which the machinery must operate are unfavorable as regards space, and it is desirable that it exert the utmost possible power when fighting; and also that the submarine have as large a cruising radius as possible. The internal combustion engine develops greater power when permitted to run at a high speed;—that is, it may be made smaller for a given power output if it is of the high speed type. Such engines also run most efficiently at full speed. On the other hand, large moderate-speed propellers are generally more efficient than small high-speed propellers. For these reasons a speed reducing transmission is desirable. A speed changing transmission is also necessary if the engine is to run at its best speed both when it alone is driving the vessel, and when it is being aided by the battery to drive the vessel; since different power output necessarily involves different propeller speed,—and the engine has only one best speed. Similarly, if supplemental engines were substituted for the battery, a speed changing transmission would be required for best results.

The power required to propel a vessel increases approximately as the cube of the speed. Hence to get the most desirable fighting speed, every source of power must be drawn upon for all it can possibly give. While electric motors, particularly of the type previously mentioned, may be made very compact and powerful, their power is limited by the battery. While the size of the battery might be somewhat increased in some submarines, it is impossible to considerably multiply the relative size of the battery, owing to the lack of space in such vessels. Some storage battery cells, such as the Edison for example, can withstand very high discharge rates without excessive deterioration, and hence can for a limited time supply several times the normal quantities of current,—though the voltage is below normal and decreases as the discharge progresses. The voltage however is sufficiently high so that the temporary power output is considerably greater than at the normal rate of discharge. With properly designed motors, having an ample and preferably variable cross-sectional area of armature conductors, as described,—this great flow of low voltage current may be utilized, and the maximum power may be extracted from the battery.

With these considerations in mind, the operation of the modification shown in Fig. 1 will now be described. Assume for example that the engine 1, generator 3, and motor 6 are of equal power. For cruising the controller 15 is operated to electrically connect the generator 3 and motor 6 as an electric transmission system,—the clutch 7 being disconnected (see Q or P, Fig. 12). The engine 1 may then run at its best speed under the most favorable conditions, while the propeller is efficiently driven through the motor 6 at a lower speed. Under these conditions the particular speed of the vessel may be regulated at the controller by varying the internal series or parallel armature connections of the motor or generator or both,—or by changing the field strengths, putting resistance in the armature circuit, or by any other well known method of D. C. motor speed control. The speed of the vessel may also be regulated by changing the engine speed if desired, without necessarily changing the reduction ratio of the electric transmission. With this electric transmission the engine may deliver its full power to propel the vessel, since the propeller may be sufficiently large to deliver the full power of the engine even though rotating at a lower speed than the engine. Now assume that an emergency arises, as in fighting, when even greater speed is desired. This will require greater propeller speed and greater power, but the engine speed or power cannot be very greatly increased. The controller 15 is then operated to connect the generator 3 to the storage battery 10,—the generator 3 now operating as a motor, not as a generator (by changing the field or armature circuits as described), and the motor 6 is also connected to the storage battery 10 (see U, Fig. 12). At the same time the clutch 7 is thrown in. There are now two electric motors and one engine, all direct-connected to drive the propeller shaft 5. It only remains to supply the two motors with sufficient electric power from the battery 10 to raise the total shaft H. P. to the amount required to run the propeller at engine speed. This great power is extracted from the battery by using only a slight counter E. M. F. in the motor armature circuits so that the battery is nearly short-circuited, as has been described;—for example, the usual five hour battery may be discharged in an hour or half an hour. The current is held within bounds principally by the internal resistance of the cells, and the battery should be well cooled and ventilated during this period. The motors, having an extremely large conducting area in their armatures, are peculiarly capable of developing large amounts of power from large currents at sub-normal voltages. As the voltage falls off during discharge, the armatures or fields of the motors may be altered to draw still greater armature currents, and thus hold the motors and propeller up to speed in spite of the dying voltage. The submarine may thus exhibit a burst of speed, for say three-quarters of an hour,—sufficient to consummate the attack or to escape from a threatened danger.

If it is desired to run on battery alone,—as when submerged, for example,—the controller 15 is operated to connect the motor 6 with the storage battery 10, and the clutch 7 is disconnected (see S, Fig. 12). If a clutch is provided between the engine 1 and the generator 3, it may be disconnected and the clutch 7 may remain connected,—giving two motors, 3 and 6, to drive the propeller, (the generator 3 being then run as a motor connected to the battery 10 by changing the field or armature circuits as described). Since the motor 6 can develop all the power usually desired for submerged running, a clutch between the engine 1 and generator 3 is generally not necessary. The motor and battery connections may be regulated at the controller to give a normal moderate rate of battery discharge, and a moderate running speed for the propeller, so as to give a large cruising radius on battery alone, if desired. The type of motor mentioned as preferable in this specification is here particularly desirable, as it has inherently a number of different running speeds, and so the most efficient cruising speed for the vessel may be selected.

To charge the battery the controller 15 is operated to connect the generator 3 to the battery 10. The generator 3 is now operated as a generator driven by the engine 1, the circuits being arranged so as to give a suitable rate of current flow from the generator to the battery. Various rates of flow and various selected battery cells may be charged through the controller 15, as described above. The battery may also be charged while the generator 3 is driving the motor 6, if desired,—by running the motor 6 sufficiently slowly so as not to require the full engine power to propel the boat (see P, Fig. 12). Thus the batteries may be gradually recharged while the vessel is cruising along under engine power.

The submarine is readily reversed without stopping or reversing the engine 1,—by simply reversing the motor 6 by means of the controller 15. To quickly bring the propeller motor to rest, as in reversing, the resistance 17 may be connected into the armature circuit to act as a brake if desired, to absorb the momemtum of the rotating mass. By thus putting the vessels propulsion into an electrical form, it is readily controlled by the navigator.

The operation of the modification shown in Fig. 2 is similar to that of Fig. 1, in that an electric reduction transmission is provided between the engine and the high-power propeller, for driving the vessel at whatever speeds can be obtained by engine power alone: and for extreme speeds the full engine power and the maximum battery power are simultaneously delivered to the propeller to drive it at its maximum speed,—without overspeeding the engine, which continues to run at its best speed. Both modifications provide an electric reverse gear, a wide variety of boat speeds with an efficient engine speed, and a centralized electric control. The two modifications differ in that the mechanical connection between engine and propeller is dispensed with in Fig. 2,—permitting the engine speed to be entirely independent of the propeller speed at all times; and allowing a number of separate generator units, placed wherever convenient, to drive each propeller, thus aiding in a compact design and increasing reliability.

For cruising,—and running at all speeds attainable by engine power alone,— the controller 15' is operated to connect the generator 3' and motor 6' to form an electric transmission system (see Q or P, Fig. 12), and the speed may be regulated as described in regard to Fig. 1. For extreme fighting speeds the controller 15' is operated to retain an electrical connection in Fig. 2, instead of introducing a mechanical connection as in Fig. 1,—and the battery is also connected to the motor 6' (see T or T', Fig. 12). The use of a type of motor having numerous independent armature circuits facilitates its running on currents from two different sources,—possibly at different voltages, (since the armature connections could give two independent armature circuits, each independently variable). By suitably balancing the voltages of the generator and battery, (as by changing the generator field excitation for example),—and by weakening the motor field to draw more current as the voltage falls, it is possible to run the motor 6' from both sources even if the particular type of motor above referred to is not used. Of course two separate motors might be provided,—one for the battery and one for the generator current; and aside from the disadvantage of extra weight and expense, would operate satisfactorily. The maximum power for a burst of speed is thus delivered to the propeller, and is maintained in the face of a falling voltage as described in connection with Fig. 1.

For running on battery alone the controller 15' is operated to disconnect the generator 3' from the motor 6', and to connect the motor 6' to the battery 10' (see S, Fig. 12). Aside from maximum speed, the controller is arranged to also give lower, more economical motor speeds; and with the preferred type of variable speed motor the speed may be so low as to give a large cruising radius on battery alone. Reversing and the various running speeds are readily obtained through the controller 15' in the manner described.

Since the engine may continue to run at full speed and may be disregarded by the navigating officer in maneuvering the vessel,—the electric control, located near the navigator if desired, may be conveniently operated by him with promptness and certainty.

It will be apparent from the foregoing that the fundamental features of this system of submarine propulsion may be used with a great variety of electrical apparatus, and that the particular construction of the different elements will vary according as one type or another of motor, generator, controller, battery, etc., is used,—as will be apparent to those skilled in the art. Hence the system should not be understood as limited to certain specific constructions of the elements, but as covering all modifications within the scope of my invention, as pointed out in the following claims:

1. In a propulsion system for vessels, the combination of an engine, a propeller, an electric generator and an electric motor arranged to constitute an electric transmission between the engine and propeller, and a storage battery for supplying additional power to the electric motor,—the electric circuit from the generator through the motor being independent of the electric circuit from the battery through the motor.

2. In a propulsion system for vessels, the combination of an engine, a propeller, an electric generator and an electric motor arranged to constitute an electric transmission between the engine and the propeller for ordinary propeller speeds, means for changing the speed ratio between the engine and propeller, a clutch for giving direct mechanical transmission of power between the engine and propeller for higher propeller speeds, and electrical means to supply supplemental power to the motor when the clutch has been engaged to give sufficient additional power to give said higher propeller speeds.

3. In a propulsion system for vessels, the combination of an engine, a propeller, an electric generator and an electric motor arranged to constitute an electric transmission between the engine and the propeller for ordinary propeller speeds, means for changing the speed ratio between the engine and the propeller, a clutch for giving direct mechanical transmission of power between the engine and propeller for higher propeller speeds, and a storage battery to supply supplemental power to the motor when said clutch has been engaged to give sufficient additional power to give said higher propeller speeds.

4. In a propulsion system for vessels, the combination of an engine, a propeller, an electric transmission comprising a generator connected to the engine, a transmission line, and an electric motor for driving the propeller, by which the engine running at full engine speed may drive the propeller at less than full propeller speed, and a storage battery which may be connected to the motor to supplement the engine when the propeller is driven at full speed,—the electric circuit from the generator through the motor being independent of the electric circuit from the battery through the motor.

5. In a propulsion system for submarine vessels, the method of extracting power from storage batteries which consists in rapidly discharging the battery through a motor armature, and gradually increasing the current carrying capacity of the armature circuit when the voltage decreases whereby a large watt output may be continuously maintained, in order that the vessel may be maintained at a high speed for a limited period.

6. In a propulsion system for submarine vessels, the method of operating a storage battery which consists in discharging the battery at several times its normal rate, so as to produce a rapidly falling voltage, and in correspondingly increasing the amperes flow to maintain the watt output substantially constant in order that the vessel may be maintained at a high speed for a limited period.

7. In a propulsion system for submarine vessels, the combination of a storage battery capable of rapid discharge, an electric motor connected to the battery, the motor having several independent armature circuits, means for connecting the independent armature circuits in various series and parallel relations, whereby the series connections may be decreased and the parallel connections may be increased when the battery voltage decreases, to hold the motor up to speed.

8. In a propulsion system for submarine vessels, the combination of a storage battery capable of rapid discharge, a homopolar electric motor having several independent armature circuits, means for connecting the independent armature circuits in various series and parallel relations, whereby the series connections may be decreased and the parallel connections increased when the battery voltage decreases, to hold the motor up to speed.

9. In a propulsion system for vessels, the combination of an engine, an electric generator driven by the engine, a propeller, an electric motor connected to the propeller, a storage battery, and means whereby the engine running at full engine speed may drive the propeller at less than full propeller speed, the engine and battery together may drive the propeller at full propeller speed, the battery alone may drive the propeller, and the generator may charge the battery,—the electric circuit from the generator through the motor being independent of the electric circuit from the battery through the motor.

10. In a propulsion system for vessels, the combination of an engine, an electric generator driven by the engine, a propeller, an electric motor connected to the propeller, a storage battery, a controller, leads connecting the controller with the generator, motor, and battery,—the controller being arranged to connect the generator to the motor for different running speeds, to connect the battery and motor for different running speeds, and to connect the generator and battery for charging the battery,—the electric circuit from the generator through the motor being independent of the electric circuit from the battery through the motor.

11. In a propulsion system for vessels, the combination of an engine, an electric generator driven by the engine, a propeller, an electric motor connected to the propeller, a storage battery, a controller, leads connecting the controller with the generator, motor, and battery, the controller being arranged to connect the generator to the motor for different running speeds, to connect the battery and motor for different running speeds, to connect both the battery and generator to the motor so that both may combine to drive the propeller, and to connect the generator to the battery for charging the battery,—the electric circuit from the generator through the motor being independent of the electric circuit from the battery through the motor.

12. In a propulsion system for vessels, the combination of an engine, a propeller, a homopolar electric generator, a homopolar electric motor having several independent armature circuits, the homopolar generator and motor being arranged to constitute an electric transmission between the engine and the propeller, and a storage battery for supplying further power to the homopolar motor.

13. In a propulsion system for vessels, the combination of an engine, a homopolar electric generator driven by the engine, a propeller, a homopolar electric motor connected to the propeller, a storage battery, and means whereby the engine running at full engine speed may drive the propeller at less than full propeller speed, the engine and battery together may drive the propeller at full propeller speed, the battery alone may drive the propeller, and the homopolar generator may charge the battery,—the electric circuit from the generator through the motor being independent of the electric circuit from the battery through the motor.

14. In a propulsion system for vessels, the combination of an engine, a homopolar electric generator driven by the engine, a propeller, a homopolar electric motor connected to the propeller, a storage battery, a controller, leads connecting the controller with the generator, motor, and battery, the controller being arranged to connect the generator to the motor for different running speeds, to connect the battery and the motor for different running speeds, and to connect the generator and battery for charging the battery,—the electric circuit from the generator through the motor being independent of the electric circuit from the battery through the motor.

15. In a propulsion system for submarine vessels, the combination of an engine, a homopolar electric generator driven by the engine, a propeller, a homopolar electric motor connected to the propeller, a storage battery, a controller, leads connecting the controller with the generator, motor, and battery,—the controller being arranged to connect the generator to the motor for different running speeds, to connect the battery and motor for different running speeds, to connect both the battery and generator to the motor so that both may combine to drive the propeller, and to connect the generator to the battery for charging the battery,—the electric circuit from the generator through the motor being independent of the electric circuit from the battery through the motor.

16. In a propulsion system for vessels, the combination of an engine, an electric generator driven by the engine, a propeller, an electric motor connected to the propeller, a storage battery, a clutch between the engine and motor, and means to connect the generator and motor to act as an electrical reduction transmission when the clutch is disengaged, and to connect the battery both to the motor and to the generator operating as a motor when the clutch is engaged, so that the engine and two motors may propel the vessel, and to connect the generator to the battery for charging the battery.

17. In a propulsion system for vessels, the combination of an engine, an electric generator driven by the engine, a propeller, an electric motor connected to the propeller, a storage battery, means to connect the generator and motor to form an electric transmission between the engine and the propeller whereby the engine may drive the propeller at a speed less than that of the engine, a clutch between the engine and motor through which the engine may have a direct drive to the propeller, a storage battery, and means to connect the battery to both the motor and generator to drive both the motor and generator as motors when the clutch is engaged for direct drive, whereby the propeller may be driven at full engine speed by the combined power of the battery and engine.

18. In a propulsion system for vessels, the combination of an engine, an electric generator driven by the engine, a propeller, an electric motor connected to the propeller, a storage battery, a clutch between the engine and motor, a controller having connections to the generator, to the motor, and to the battery, whereby the generator may be connected to the motor to form an electrical transmission between the engine and propeller when the clutch is disengaged, the controller being also arranged so that it may connect the motor and generator to run as two motors from the battery power when the clutch is engaged.

19. In a propulsion system for vessels, the combination of an engine, an electric generator driven by the engine, a propeller, an electric motor connected to the propeller, a storage battery, a clutch between the engine and motor, a controller having connections to the generator, to the motor, and to the battery, whereby the generator may be connected to the motor to form an electrical transmission between the engine and propeller when the clutch is disengaged, the controller being also arranged so that it may connect the motor and generator to run as two motors from the battery power when the clutch is engaged, the controller having also connections by which the generator may charge the battery, and further connections by which the battery alone may drive the propelling motor.

20. In a propulsion system for vessels, the combination of an engine, a propeller, an electric motor direct connected to the engine, a second electric motor direct connected to the propeller, a clutch between the two motors whereby both motors and the engine may simultaneously have a direct transmission of mechanical power to the propeller, and means for operating the first mentioned motor as a generator to electrically drive the second mentioned motor at a different speed than the engine when the clutch is disengaged.

21. In a propulsion system for vessels, the combination of an engine, a propeller, an electric motor direct connected to the engine, a second electric motor direct connected to the propeller, a clutch between the two motors whereby both motors and the engine may have a direct drive to the propeller, a storage battery for driving the two motors when the clutch is engaged, and means for operating the first mentioned motor as a generator to electrically drive the second mentioned motor at a different speed than the engine when the clutch is disengaged.

22. In a propulsion system for vessels, the combination of an engine, a propeller, an electric generator driven by the engine, a homopolar electric motor connected to the propeller, a clutch between the generator and the propeller, a storage battery, a controller connected with the generator, motor and battery, whereby when running on engine power alone the generator and motor may be connected to form an electric transmission between engine and propeller with the clutch disengaged, when running at full propeller speed with the clutch engaged the motor and generator may operate as two motors run from the storage battery to drive the propeller aided by the engine power transmitted directly mechanically to the propeller, and whereby the battery may be charged from the generator, and when running with the clutch disengaged the battery alone may drive the motor and propeller.

23. In a propulsion system for vessels, the combination of an engine, a propeller, an electric generator driven by the engine, a homopolar electric motor connected to the propeller, said motor having several insulated armature circuits which may be connected in various series and parallel relations to give different running conditions, a clutch between the engine and the propeller, a storage battery capable of a high rate of discharge, a controller having connections whereby the generator, motor and battery may be connected as follows: (1) the generator to the motor to form an electric transmission between the engine and the propeller, with the clutch disengaged, (2) the battery to both the generator and the motor, operating as two motors, to aid the engine in directly driving the propeller with the clutch engaged, (3) the battery to the propeller motor for running on battery alone, (4) the generator to the battery for charging the battery.

In witness whereof I have hereunto set my hand this third day of February, 1916.

ROBERT V. MORSE.

Witnesses:
V. D. MORSE,
A. B. WRAY.